United States Patent
Stauffer et al.

(10) Patent No.: US 9,593,740 B2
(45) Date of Patent: Mar. 14, 2017

(54) ENERGY-ABSORBING COMPOSITE TENSION-SHEAR FITTING

(71) Applicant: The Boeing Company, Chicago, IL (US)

(72) Inventors: Matthew S. Stauffer, Bridgeport, PA (US); Douglas R. Ludin, Malvern, PA (US); Eric J. Schulze, Hockessin, DE (US)

(73) Assignee: The Boeing Company, Chicago, IL (US)

( * ) Notice: Subject to any disclaimer, the term of this patent is extended or adjusted under 35 U.S.C. 154(b) by 46 days.

(21) Appl. No.: 14/711,199

(22) Filed: May 13, 2015

(65) Prior Publication Data

US 2016/0333960 A1    Nov. 17, 2016

(51) Int. Cl.
*F16F 15/04* (2006.01)
*B64C 1/20* (2006.01)

(52) U.S. Cl.
CPC .............. *F16F 15/04* (2013.01); *B64C 1/20* (2013.01)

(58) Field of Classification Search
CPC .. F16F 15/02; F16F 15/04; F16F 15/06; F16F 7/08; F16F 7/082; F16F 7/087; F16F 7/12; B64C 1/20
See application file for complete search history.

(56) References Cited

U.S. PATENT DOCUMENTS

| | | | |
|---|---|---|---|
| 2,138,175 A | 11/1938 | Keys | |
| 2,578,903 A * | 12/1951 | Smith | B61K 7/18 188/374 |
| 3,734,554 A * | 5/1973 | Schwabenlender | B60R 19/26 267/140 |
| 4,149,742 A * | 4/1979 | Fannin | B60R 19/26 267/139 |
| 4,822,011 A * | 4/1989 | Goldbach | B60R 19/26 267/140 |
| 4,929,008 A * | 5/1990 | Esfandiary | B60R 19/20 188/376 |
| 5,669,633 A * | 9/1997 | Naff | B62D 1/192 188/376 |

(Continued)

FOREIGN PATENT DOCUMENTS

| CN | 103786868 | 5/2014 |
|---|---|---|
| EP | WO2013135855 | 9/2013 |

OTHER PUBLICATIONS

European Search Report issued Nov. 3, 2016 in co-pending European Patent Application No. 16158139.2.

*Primary Examiner* — Vishal Sahni
(74) *Attorney, Agent, or Firm* — Joseph M. Rolnicki; Evans & Dixon, L.L.C.

(57) ABSTRACT

An energy absorbing fitting is constructed to absorb tension, shear and compression loads at a joint between two composite material beams of a composite material frame. The fitting is constructed with a band of composite material having an inverted U-shape, a panel of composite material having a U-shaped cross-section configuration that is assembled into the inverted U-shaped configuration of the band, and a sheet of composite material having an inverted L-shape configuration that is secured to the band and to the panel. The fitting is positioned at the intersection of the beams and is secured to the joint between the beams, thereby reinforcing the joint against tension, shear and compression loads.

20 Claims, 9 Drawing Sheets

(56) References Cited

U.S. PATENT DOCUMENTS

| | | | |
|---|---|---|---|
| 6,189,929 B1* | 2/2001 | Struble | B62D 1/192 |
| | | | 280/777 |
| 8,465,087 B2* | 6/2013 | Gerwolls | F16F 7/12 |
| | | | 188/377 |
| 9,249,853 B2* | 2/2016 | Cormier | F16F 7/123 |
| 2005/0200062 A1* | 9/2005 | Maurer | F16F 7/08 |
| | | | 267/144 |
| 2008/0302909 A1 | 12/2008 | Chrissos | |
| 2009/0250851 A1* | 10/2009 | Bauer | B60N 2/24 |
| | | | 267/140.11 |
| 2010/0102171 A1 | 4/2010 | Osorio | |
| 2014/0144740 A1* | 5/2014 | Ludin | F16F 7/125 |
| | | | 188/377 |

* cited by examiner

ENERGY-ABSORBING COMPOSITE TENSION-SHEAR FITTING

FIELD

The fitting of this disclosure is a structural composite tension-shear fitting for use in an aircraft structure. The fitting is designed with a novel composite layup combined with state of the art manufacturing techniques to produce a composite fitting with greater structural efficiency relative to existing metallic designs. In addition to reacting tension and shear loads, the fitting is designed to absorb energy under compression loading. The fitting may be integrated into a single piece of a structure in an aircraft floor, or can be used to join separate structural members.

BACKGROUND

A joint between two aircraft structural members that is loaded in tension, for example a cargo tie-down on an aircraft floor that in use exerts tension loads on a joint between two structural members in an underfloor frame, requires additional features to support the joint. Typically, support of the joint would be provided by separate machined metallic fittings that are mechanically fastened between the structural members. However, these metallic fittings are heavy and bulky. Furthermore, adding the metallic parts to the joint between the structural members requires additional manufacturing time that adds cost to the structure. Still further, metallic fittings added to a joint between two structural members of a frame often do not provide the level of support to the joint desired.

There are composite fittings that are designed to handle the tension loads at the joint between two structural members. However, these composite fittings require separate metallic parts, such as radius blocks, to distribute the loads exerted on the joint efficiently into the fitting. Adding the metallic parts to the joint between the structural members adds weight to the structure. Additionally, today's metallic and composite fittings are poor at absorbing energy of a compression load.

There is a need for a single fitting that combines tension, shear and a high level of energy-absorbing capability in a single structural element.

SUMMARY

The energy-absorbing composite tension-shear fitting of this disclosure fills the need for a single structural element that can provide high tension load carrying ability to a joint between two structural members and can also absorb and dissipate a compression load.

The fitting is basically comprised of a band having an inverted U-shape, a panel having a U-shape cross-section configuration, and a sheet having an inverted L-shape. Each of the three component parts is constructed of a composite material.

The band has an elongate length with a rectangular configuration. The length of the band is bent at an intermediate portion of the band giving the band its inverted U-shape. The band has a front edge and a rear edge, both of which have the inverted U-shape. A first end portion of the length of the band extends downwardly from one side of the band intermediate portion and a second end portion of the length of the band extends downwardly from the opposite side of the band intermediate portion. The first end portion and the second end portion extend straight downwardly from the intermediate portion defining a space between the first end portion and the second end portion.

The panel has a rectangular configuration. The panel has a length between a first end edge at a bottom of the panel and a second end edge at a top of the panel. The panel has a width between a first side edge at one side of the panel and a second side edge at the opposite side of the panel. An intermediate portion of the width of the panel is bent in a general U-shape. A first side portion of the width of the panel extends outwardly from one side of the panel intermediate portion and a second side portion of the width of the panel extends outwardly from the opposite side of the panel intermediate portion. The first and second side portions of the panel width extend straight from the intermediate portion of the panel and are parallel.

The panel is positioned inside the U-shaped configuration of the band. The panel first side portion engages against and is secured to the band first end portion and the panel second side portion engages against and is secured to the band second end portion.

The sheet also has a rectangular configuration. The sheet has a length between a first end edge at the bottom of the sheet and a second end edge at the top of the sheet. The length of the sheet has a bend that extends across the sheet. The bend divides the sheet into a first end portion of the length of the sheet and a second end portion of the length of the sheet on opposite sides of the bend. The bend in the length of the sheet orients the first end portion of the length of the sheet and a second end portion of the length of the sheet at a right angle.

The sheet is positioned behind the band and behind the panel. The first end portion of the length of the sheet engages against and is secured to the rear edge of the band and the back of the panel intermediate portion. The second end portion of the length of the sheet engages over and is secured to the top of the U-shape intermediate portion of the band.

Cavities between the top edge of the panel and a bottom surface of the band intermediate portion and between a top surface of the band intermediate portion and a bottom surface of the sheet second end portion are filled with pre-cured composite pieces, for example molded or machined composite, or filled with chopped composite fiber during a compression molding process of the fitting.

In use, the fitting is secured to the intersection of composite structural beams of an aircraft structural frame. So positioned, the fitting provides reinforcement at the joint of the composite structural beams to tension and shear loads exerted on the joint. The fitting also reinforces the joint and absorbs energy under compression loading.

Multiple bands and panels can also be formed into a single fitting to achieve higher tension, shear and compression capacity.

The features, functions, and advantages that have been discussed can be achieved independently in various embodiments or may be combined in yet other embodiments, further details of which can be seen with reference to the following description and drawings.

DESCRIPTION

Figure 1:
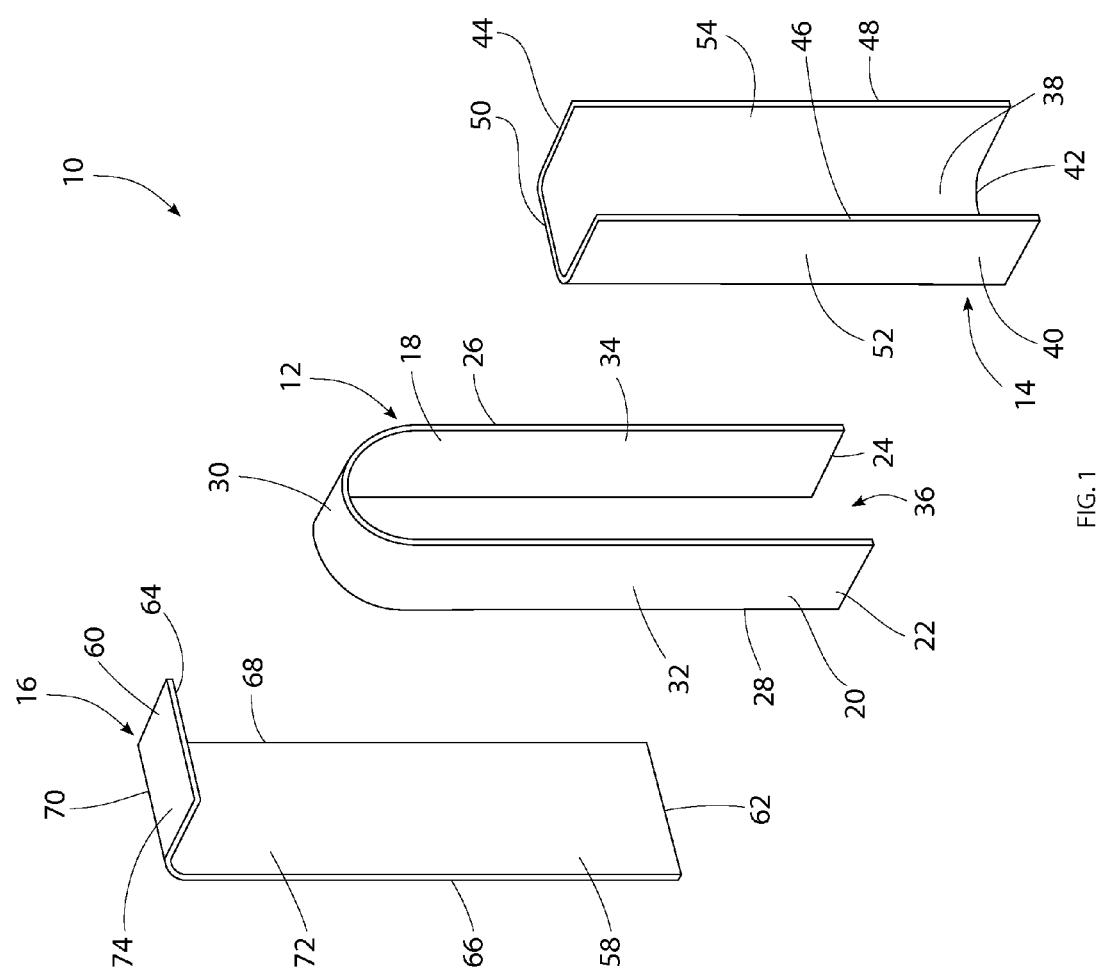
FIG. 1 is a representation of a perspective view of the separate component parts that construct the energy-absorbing composite tension-shear fitting of this disclosure.

FIG. 1 is a representation of a perspective view of the component parts that go into the construction of a first aspect of the energy absorbing composite tension-shear fitting 10. As represented in FIG. 1, the fitting 10 is comprised of a band 12 having an inverted U-shape, a panel 14 having a U-shape cross-section configuration, and a sheet 16 having an inverted L-shape. Each of these three component parts is constructed of a composite material as will be explained.

The band 12 is constructed of unidirectional composite material, although other equivalent materials could be employed in the band construction. The band 12 has an elongate length with a rectangular configuration. The band length has a flat first surface 18 and a flat second surface 20 on opposite surfaces of the band. The band length extends between a first end edge 22 and a second end edge 24 at opposite ends of the band. The band 12 has a width between a front edge 26 and a rear edge 28 of the band. The band front edge 26 and rear edge 28 are positioned in parallel planes. As can be seen in FIG. 1, the band 12 has a thickness that is much smaller than the width of the band. The unidirectional composite material that goes into the construction of the band 12 is oriented so that the plys of the material are directed along the length of the band between the band first end edge 22 and the band second end edge 24.

An intermediate portion 30 of the length of the band 12 is formed with an inverted U-shape. The inverted U-shape of the intermediate portion 30 of the band positions the band first surface 18 as an interior surface of the band and positions the band second surface 20 as an exterior surface of the band. The intermediate portion 30 of the band length is positioned between a first end portion 32 of the band length and a second end portion 34 of the band length. The first end portion 32 of the band length extends straight downwardly from the intermediate portion 30 of the band to the first end edge 22 of the band and the second end portion 34 of the band length extends straight downwardly from the intermediate portion 30 of the band to the second end edge 24 of the band. The first end portion 32 and the second end portion 34 of the band length are parallel. The parallel first end portion 32 and second end portion 34 of the band length define a space 36 between the first end portion 32 and the second end portion 34. The first end edge 22 and the second end edge 24 of the band are also parallel. The band intermediate portion 30, first end portion 32 and second end portion 34 are formed rigid of the composite material in the inverted U-shape configuration represented in FIG. 1.

The panel 14 is constructed to fit inside the space 36 of the band 12. The panel 14 is constructed of multidirectional composite material, although other equivalent materials could be employed in the construction of the panel 14. The panel 14 has a rectangular configuration with a flat first surface 38 and a flat second surface 40 on opposite surfaces of the panel. As viewed in FIG. 1, the panel first surface 38 is a front surface of the panel and the panel second surface 40 is a rear surface of the panel. The panel has a length with a first end edge 42 at the bottom of the panel as viewed in FIG. 1 and an opposite second end edge 44 at the top of the panel as viewed in FIG. 1. The first end edge 42 and second end edge 44 of the panel are parallel. The panel 14 has a width between a first side edge 46 and an opposite second side edge 48 of the panel. The first side edge 46 and second side edge 48 of the panel are parallel. It can be seen in FIG. 1 that the panel has a thickness that is much smaller than the panel width.

The width of the panel has an intermediate portion 50 that has a U-shaped configuration in a horizontal cross-section of the panel. The panel intermediate portion 50 separates a first side portion 52 of the width of the panel from a second side portion 54 of the width of the panel. The first side portion 52 of the width of the panel extends straight from the panel intermediate portion 50 to the first side edge 46 of the panel and the second side portion 54 of the width of the panel extends straight from the panel intermediate portion 50 to the second side edge 48 of the panel. The panel first side portion 52 and the panel second side portion 54 are parallel. The panel intermediate portion 50, the panel first side portion 52 and the panel second side portion 54 are formed rigid of the composite material in the U-shaped configuration represented in FIG. 1.

The sheet 16 is constructed of unidirectional composite material, although other equivalent materials could be employed in the construction of the sheet 16. The sheet 16 also has an elongate rectangular configuration with a flat first surface 58 and a flat second surface 60 on opposite surfaces of the sheet 16. As viewed in FIG. 1, the sheet first surface 58 is a front surface of the sheet and the sheet second surface 60 is a rear surface of the sheet. The sheet 16 has a length that extends between a first end edge 62 at the bottom of the sheet as viewed in FIG. 1 and an opposite second end edge 64 at the top of the sheet as viewed in FIG. 1. The sheet first end edge 62 and second end edge 64 are parallel. The sheet 16 has a width between a first side edge 66 and an opposite second side edge 68 of the sheet. The sheet first side edge 66 and second side edge 68 are parallel. It can be seen in FIG. 1 that the sheet 16 has a thickness that is much smaller than the sheet width.

An intermediate portion of the length of the sheet 16 has a bend 70 that extends across the length of the sheet. The bend 70 divides the sheet between a first end portion 72 of the length of the sheet and a second end portion 74 of the length of the sheet. The bend 70 across the length of the sheet orients the sheet first end portion 72 and second end portion 74 at a right angle. The sheet bend 70, the sheet first end portion 72 and the sheet second end portion 74 are formed rigid of the composite material in the inverted L-shaped configuration as represented in FIG. 1.

Figure 2:
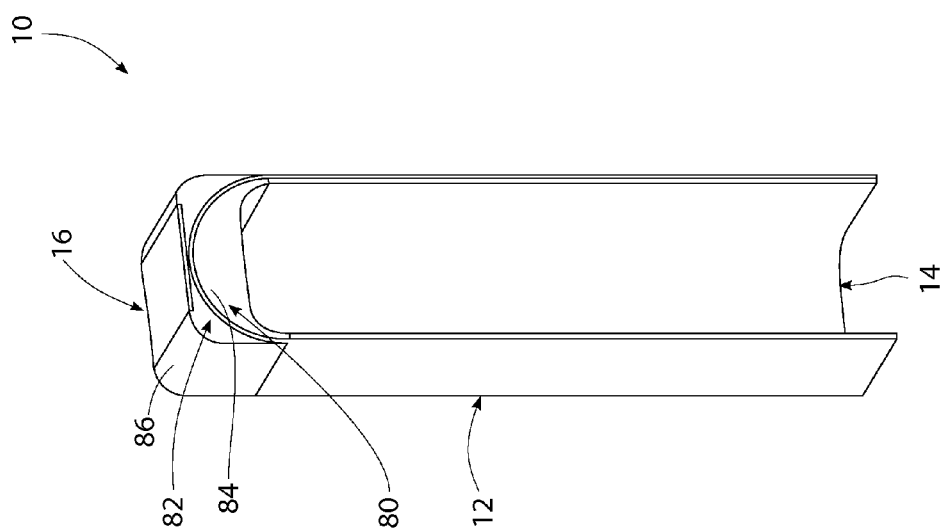
FIG. 2 is a representation of a perspective view of the assembled component parts of FIG. 1.
Figure 3:
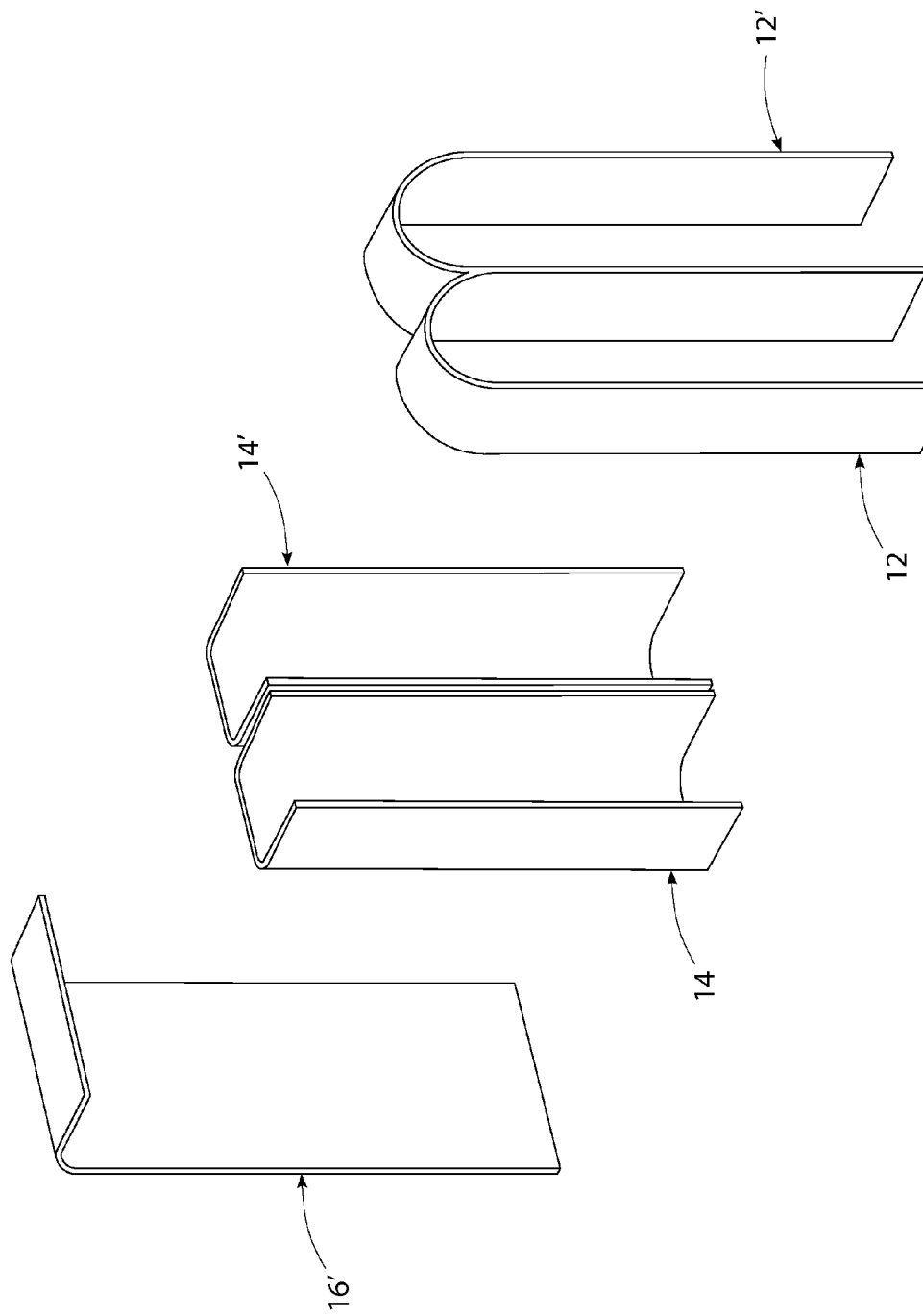
FIG. 3 is a representation of the component parts of an alternative construction of the fitting shown in FIGS. 1 and 2.
Figure 4:
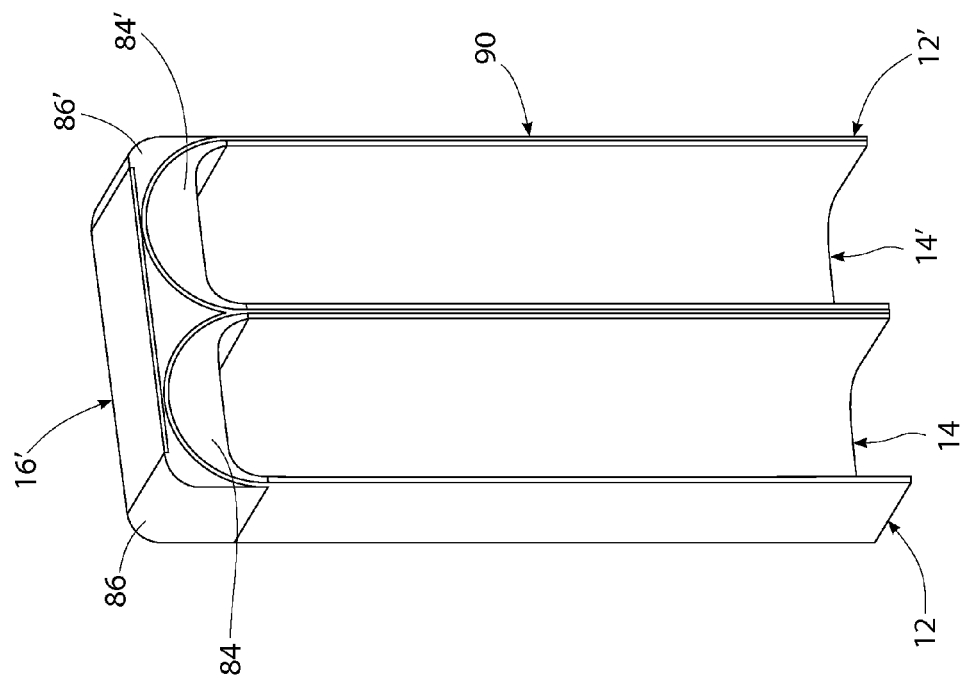
FIG. 4 is a representation of a perspective view of the assembled component parts of FIG. 3.
Figure 5:
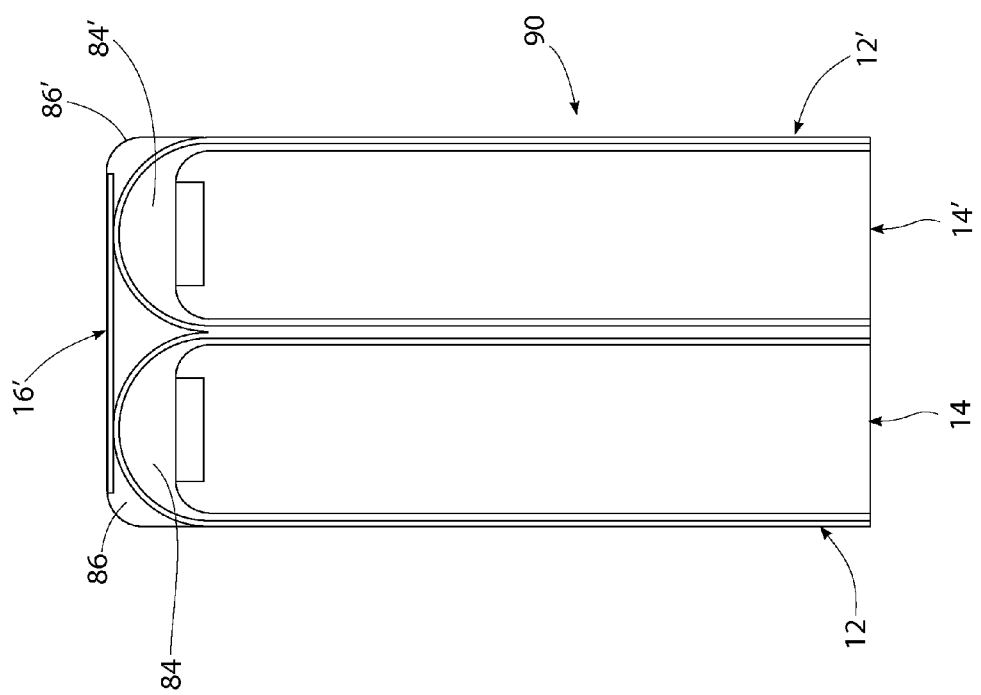
FIG. 5 is a representation of an elevation view of the fitting of FIG. 4.
Figure 6:
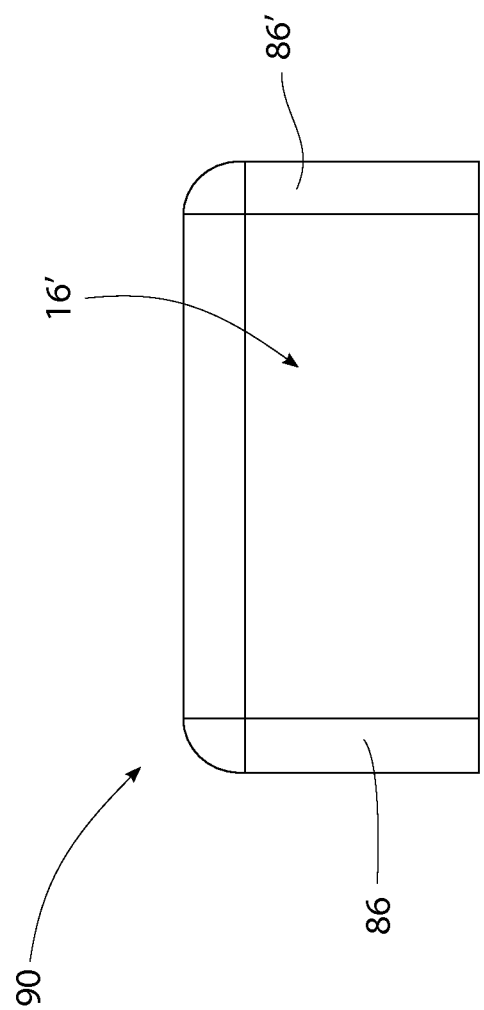
FIG. 6 is a representation of a top plan view of the fitting of FIG. 4.
Figure 7:
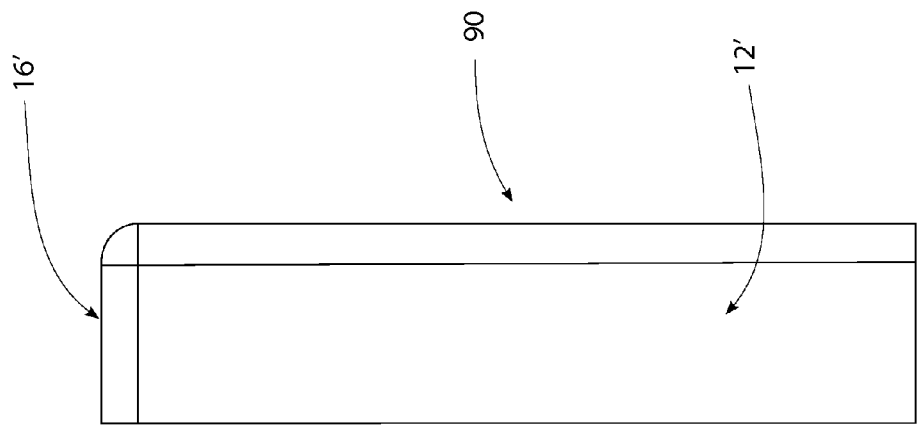
FIG. 7 is a representation of a side elevation view of the fitting of FIG. 4.

The relative positions of the band 12, the panel 14 and the sheet 16 of the assembled fitting 10 are represented in FIG. 2. As represented in FIG. 2, the panel 14 is positioned in the space 36 inside the inverted U-shaped configuration of the band 12. The panel second or rear surface 40 along the panel first side portion 52 is secured to the band first or interior surface 18 along the band first end portion 32. The panel second or rear surface 40 along the panel second side portion 54 is secured to the band first or interior surface 18 along the band second end portion 34. The rear surface of the panel 14 in the intermediate portion 50 of the panel is positioned in a same plane as the rear edge 28 of the band 12. Additionally, the first side edge 46 and second side edge 48 of the panel 14 are positioned in a same plane as the front edge 26 of the band 12. The panel 14 and band 12 can be secured together as described above according to any known methods of securing together parts constructed of composite materials.

The sheet 16 is positioned behind the band 12 and the panel 14 and over the band 12 as represented in FIG. 2. The sheet first or front surface 58 along the sheet first end portion 72 engages against and is secured to the panel second or rear surface 40 along the panel intermediate portion 50. The sheet first or front surface 58 along the sheet first end portion 72 also engages against and is secured to the band rear edge 28 along the length of the band. The sheet first or front surface 58 along the sheet second end portion 74 engages against and is secured to the band second or exterior surface 20 on the band intermediate portion 30. Again, as described above, the sheet 16 can be secured to the panel 14 and the band 12 according to any known methods of securing together parts of composite materials.

With the particular configurations of the band 12, the panel 14 and the sheet 16 represented in FIG. 2, a first cavity 80 is formed between the panel second or top end edge 44 and the band first or interior surface 18 on the intermediate portion 30 of the band. A second cavity 82 is formed between the band second or exterior surface 20 on the intermediate portion 30 of the band and the sheet first or front surface 58 on the second end portion 74 of the sheet. These cavities 80, 82 can be filled with pre-cured composite pieces, for example molded or machined composite, or filled with chopped composite fiber during a compression molding process of the fitting 10. Alternatively, the cavities 80, 82 could be filled with respective blocks of material 84, 86.

FIGS. 3-7 show a variation in the construction of a fitting 90. The fitting 90 is basically constructed as described earlier of two of the bands 12, 12', two of the panels 14, 14' and a wider sheet 16' described earlier. The constructions of the bands 12, 12', the panels 14, 14' and the wider sheet 16' is substantially the same as those of the fitting 10 described earlier. The features of the bands 12, 12', the panels 14, 14' and the wider sheet 16' are the same as those of the fitting 10 described earlier and are labeled with the same reference numbers followed by a prime ('). Because the features of the fitting 90 are basically the same as described earlier, they will not be described again herein. The fitting 90 shown in FIGS. 3-7 represents the ability of the fitting to be constructed of multiples of the bands 12, the panels 14 and the sheets 16 described earlier to provide even greater reinforcement to a joint between two structural members of an aircraft frame.

Figure 8:
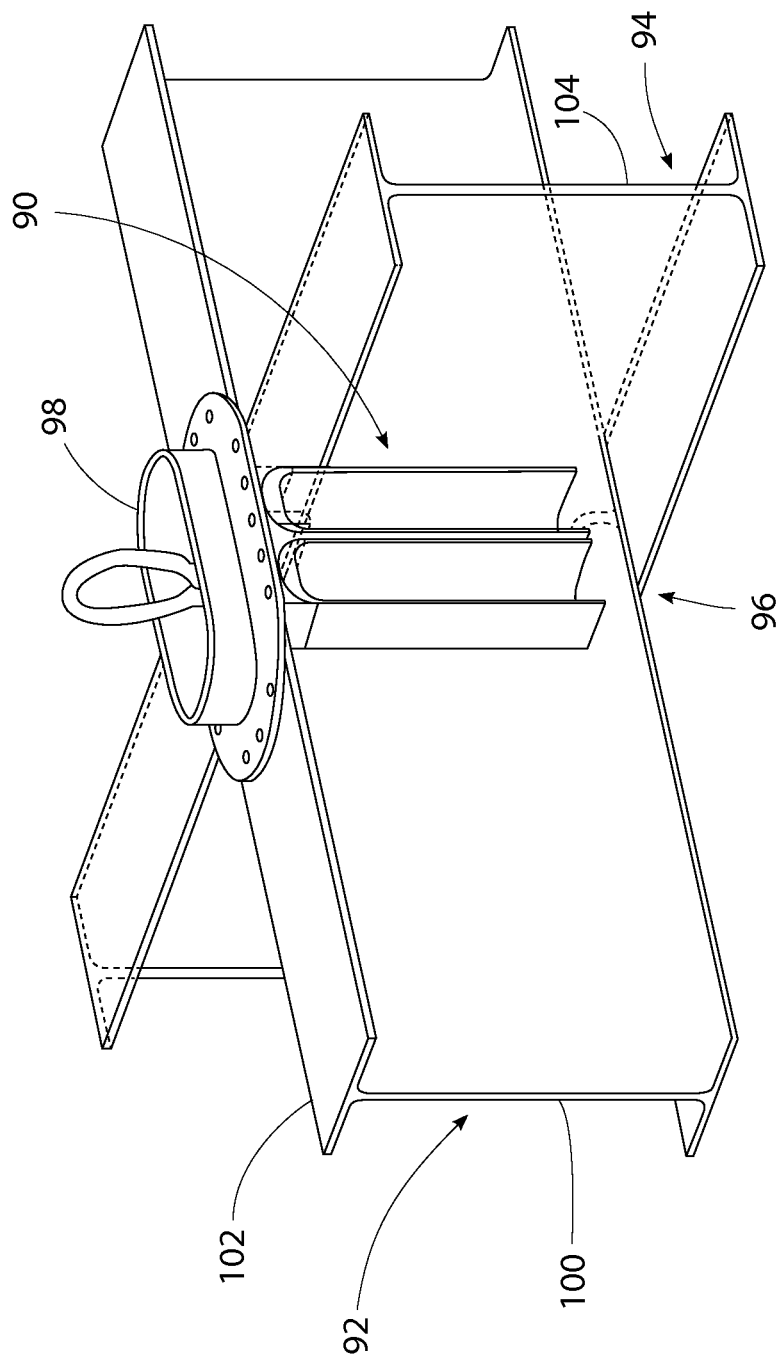
FIG. 8 is a representation of a perspective view of the fitting of FIG. 4 positioned at a joint between two structural beam members of an aircraft frame.
Figure 9:
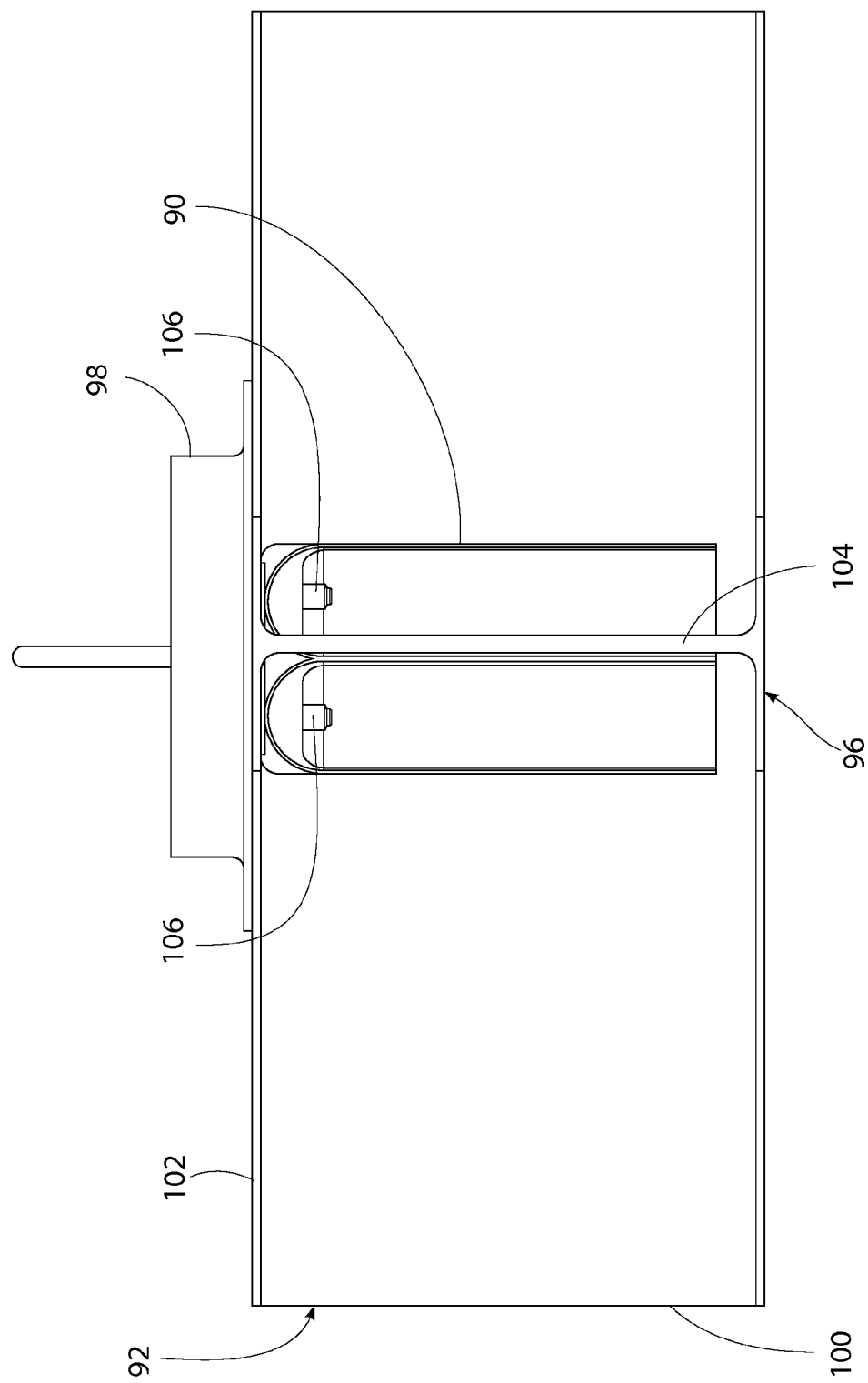
FIG. 9 is a representation of a cross-section view of the fitting and joint of FIG. 8.

FIGS. 8 and 9 are representations of the fitting 90 of FIGS. 3-7 secured to a joint at the intersection of two structural members or I beams 92, 94 of an aircraft frame. In FIGS. 8 and 9 the fitting 90 is shown reinforcing the intersection or joint 96 between the first composite beam 92 and the second composite beam 94. The joint 96 is subject to tension and shear loads from a cargo tie-down 98 secured at the joint 96 of the beams 92, 94. As represented in FIGS. 8 and 9, the sheet second surface 60' is secured to the web 100 and the flange 102 of the first beam 92. The sheet second surface 60' on the first end portion 72' of the sheet is secured to the beam web 100 and the sheet second surface 60' on the sheet second end portion 74' that is secured to the beam upper flange 102. These portions of the sheet 16' can be secured to the composite material of the beam 92 according to any known methods.

The fitting 90 is positioned relative to the joint 96 of the beams 92, 94 with the center of the fitting being aligned with the web 104 of the second beam 94. The tie-down 98 is secured to the fitting with fasteners 106 that secure the tie-down to the apexes of the inverted U-shape bands 12, 12'. With a force pulling upwardly on the tie-down 98 as represented in FIGS. 8 and 9, tension forces exerted on the joint 96 of the beams 92, 94 are resisted by the fitting 90. In addition, any shear forces exerted between the beams 92, 94 are resisted by the fitting 90. Still further, any compression loads exerted on the joint 96 between the beams 92, 94 are resisted by the fitting 90.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An energy absorbing fitting comprising:
    a band of composite material, the band having a first surface and a second surface on opposite surfaces of the band, the band having an intermediate portion of the band that has an inverted U-shape, the band having a first end portion of the band that extends from the intermediate portion, the band having a second end portion of the band that extends from the intermediate portion on an opposite side of the intermediate portion from the first end portion of the band;
    a panel of composite material, the panel having a first surface and a second surface on opposite surfaces of the panel, the panel having an intermediate portion of the panel that has a u-shape, the panel having a first side portion of the panel that extends from the intermediate portion of the panel, the panel having a second side portion of the panel that extends from the intermediate portion of the panel on an opposite side of the intermediate portion of the panel from the first side portion of the panel;
    the panel being positioned inside the band with the panel first side portion engaging and secured to the band first end portion and the panel second side portion engaging with and secured to the band second end portion;
    a sheet of composite material, the sheet having a first surface and a second surface on opposite surfaces of the sheet, the sheet having a bend that extends across the sheet between a first end portion of the sheet and a second end portion of the sheet; and,
    the first end portion of the sheet being positioned over and secured to the intermediate portion of the panel and the sheet second end portion being positioned over and secured to the intermediate portion of the band.

2. The energy absorbing fitting of claim 1, further comprising:
    the band of composite material being a band of unidirectional composite material.

3. The energy absorbing fitting of claim 2, further comprising:
    the panel of composite material being a panel of multidirectional composite material.

4. The energy absorbing fitting of claim 3, further comprising:
the sheet of composite material being a sheet of unidirectional composite material.

5. The energy absorbing fitting of claim 3, further comprising:
the sheet of composite material being a sheet of multidirectional composite material.

6. The energy absorbing fitting of claim 1, further comprising:
the band first end portion and the band second end portion being parallel.

7. The energy absorbing fitting of claim 6, further comprising:
the panel first side portion and the panel second side portion being parallel.

8. The energy absorbing fitting of claim 1, further comprising:
a block of material positioned in a cavity between the intermediate portion of the band and the second end portion of the sheet.

9. The energy absorbing fitting of claim 1, further comprising:
a block of material positioned in a cavity between the intermediate portion of the band and the panel.

10. The energy absorbing fitting of claim 1, further comprising:
the band of composite material being one band of composite material of a plurality of like band of composite material in the energy absorbing fitting; and,
the panel of composite material being one panel of composite material of a plurality of panels of composite material in the energy absorbing fitting.

11. An energy absorbing fitting comprising:
a band of composite material, the band having an elongate rectangular configuration with a flat first surface and a flat second surface on opposite surfaces of the band, the band having a length with a first end edge and a second end edge at opposite ends of the length of the band, the band having a width with a front edge and a rear edge at opposite sides of the width of the band, the band having an intermediate portion of the length of the band that has an inverted u-shape, the band having a first end portion of the length of the band that extends straight from the intermediate portion of the band to the first end edge of the band, the band having a second end portion of the length of the band that extends straight from the intermediate portion of the band to the second end edge of the band, the first end portion and the second end portion of the band being parallel, and the intermediate portion of the band, the first end portion of the band and the second end portion of the band being rigid;
a panel of composite material, the panel having a rectangular configuration with a flat first surface and a flat second surface on opposite surfaces of the panel, the panel having a length with a first end edge and a second end edge at opposite ends of the length of the panel, the panel having a width with a first side edge and a second side edge at opposite sides of the width of the panel, the panel having an intermediate portion of the width of the panel that has a U-shape, the panel having a first side portion of the width of the panel that extends straight from the intermediate portion of the panel to the first side edge of the panel, the panel having a second side portion of the width of the panel that extends straight from the intermediate portion of the panel to the second side edge of the panel, the first side portion and the second side portion of the panel being parallel, and the intermediate portion of the panel, the first side portion of the panel and the second side portion of the panel being rigid;
the panel being positioned inside the band with the first side portion of the panel engaging and secured to the first end portion of the band and the second side portion of the panel engaging against and secured to the second end portion of the band;
a sheet of composite material, the sheet having a rectangular configuration with a flat first surface and a flat second surface on opposite surfaces of the sheet, the sheet having a length with a first end edge and a second end edge at opposite ends of the length of the sheet, the sheet having a width with a first side edge and a second side edge at opposite sides of the width of the sheet, the sheet having a bend that extends across the length of the sheet between a first end portion of the sheet and a second end portion of the sheet, the bend in the length of the sheet orienting the first end portion of the sheet and the second end portion of the sheet at a right angle, the sheet first end portion and the sheet second end portion being rigid; and,
the sheet first end portion being positioned over and secured to the intermediate portion of the panel and the rear edge of the band and the sheet second end portion being positioned over and secured to the intermediate portion of the band.

12. The energy absorbing fitting of claim 11, further comprising:
the band of composite material being a band of unidirectional composite material.

13. The energy absorbing fitting of claim 12, further comprising:
the panel of composite material being a panel of multidirectional composite material.

14. The energy absorbing fitting of claim 13, further comprising:
the sheet of composite material being a sheet of unidirectional composite material.

15. The energy absorbing fitting of claim 13, further comprising:
the sheet of composite material being a sheet of multidirectional composite material.

16. The energy absorbing fitting of claim 11, further comprising:
a block of material positioned in a cavity between the intermediate portion of the band and the second end portion of the sheet.

17. The energy absorbing fitting of claim 11, further comprising:
a block of material positioned in a cavity between the intermediate portion of the band and the panel.

18. The energy absorbing fitting of claim 11, further comprising:
the band of composite material being one band of composite material of a plurality of like band of composite material in the energy absorbing fitting; and,
the panel of composite material being one panel of composite material of a plurality of panels of composite material in the energy absorbing fitting.

19. A method of absorbing tension, shear and compression forces at a joint in a structural frame, the method comprising:
constructing a fitting from a band of material, the band having an inverted U-shape;

constructing a panel of material in a U-shape configuration in a horizontal plane of the panel;
positioning the panel inside the inverted U-shape of the band and securing together the band and the panel;
constructing a sheet of material with an inverted L-shape configuration;
positioning the sheet of material against the band and the panel with a portion of the sheet of material secured to the band and the panel and a further portion of the sheet of material secured to the top of the inverted U-shape of the band; and,
positioning the constructed fitting at the joint of the structural frame and securing the fitting to the joint.

20. The method of claim 19, further comprising:
constructing the band of unidirectional composite material; and,
constructing the panel of multidirectional composite material.

\* \* \* \* \*